United States Patent [19]

McMahon et al.

[11] Patent Number: 4,637,591

[45] Date of Patent: Jan. 20, 1987

[54] DROSS COOLER AND PROCESSOR

[76] Inventors: J. Philip McMahon; Han Spoel; John McGinley, all of 1087 Meyerside Dr., Units 12 and 13, Mississauga, Ontario, Canada

[21] Appl. No.: 745,244

[22] Filed: Jun. 13, 1985

[30] Foreign Application Priority Data

Jun. 22, 1984 [CA] Canada .................................. 457307

[51] Int. Cl.⁴ ............................................... C22B 7/04
[52] U.S. Cl. ........................................ 266/165; 75/24; 266/201; 266/227; 266/230; 266/241
[58] Field of Search ............... 266/227, 165, 230, 201, 266/241; 75/68 R, 24

[56] References Cited

U.S. PATENT DOCUMENTS

| 3,043,678 | 7/1962 | Lowry et al. | 75/68 R |
| 3,198,505 | 8/1965 | Ambur et al. | 266/227 |
| 3,417,930 | 12/1968 | Brumagin et al. | 241/23 |
| 4,039,173 | 8/1977 | Papafingos et al. | 266/227 |

Primary Examiner—Melvyn J. Andrews
Attorney, Agent, or Firm—Zarley, McKee, Thomte, Voorhees & Sease

[57] ABSTRACT

The invention provides dross treatment apparatus comprising a drum rotatable about a horizontal axis with means to feed dross to the inside of the drum where it is cooled and broken by tumbling and then removed from the other end of the drum for separation and treatment. The invention also provides efficient delivery apparatus for introducing the dross to the apparatus.

7 Claims, 7 Drawing Figures

DROSS COOLER AND PROCESSOR

This application relates to an improved design for a dross cooler and processor. In particular, it relates to a dross cooler and processor adapted to handle slags such as are produced by melting and smelting operations and designed to handle the dross quickly and automatically so that it is cooled and broken up efficiently.

The production of base metal such as aluminum by smelting results in a bi-product known as slag or herein referred to as "dross" composed of a scum of extraneous matter other than the metallic end product. This dross which is formed in the smelting or melting furnace typically includes large amounts of the base metal (i.e. aluminum) and thereby presents a problem.

While it is important to dispose of the dross which is separated from the base metal, it is also important to recover as much as possible of the metal contained therein.

In the past the handling of this dross and subsequent recovery of the entrapped metal has been facilitated by allowing the dross to cool to a solid or semi-solid state and thereafter breaking it up so that the metal can be separated by various means.

One method which has been commonly used is to allow the dross or slag to cool in a ladle until substantially solid and then to dump the dross on the ground where it can be further cooled and subsequently broken up by pneumatic hammers, chisels, impact mills, rotary crushers, or other means. Once broken it can be further processed by milling and separation of the metal from the non-metallic dross.

These traditional methods have been found to be slow, inefficient, time consuming, and because they must be done in batch process, rather than a continuous process, result in inefficient use of equipment and expensive man power.

It is therefore the purpose of this invention to provide apparatus which will deal with the dross from melting or smelting operations, and with appropriate modifications and other similar processes, in a more or less continuous, automatic and efficient manner. In addition, it is the purpose of this invention to facilitate the handling of dross from aluminum smelting so as to minimize the loss due to oxidation of the hot metal.

These objects and other advantages are provided by the present invention which provides dross treatment apparatus comprising a drum having a cylindrical shell mounted to rotate about a horizontal axis with means to rotate the drum and an inlet opening at one end of the drum and an outlet opening at one end of the drum and means to feed dross to the inside of said drum through the inlet opening. A series of flights at spaced intervals located on the inside surface of the drum shell are adapted to tumble the dross therein upon rotation of the drum and means is provided to remove the tumbled dross from the drum through the outlet opening.

While the inlet opening and the outlet may in fact be the same at one end of the drum, the preferred embodiment contemplates an inlet at one end and an outlet at the opposite end.

To cool the drum and remove heat from the dross a cooling bath is provided to emerse at least the lower portion of the drum as it rotates.

Ideally, the respective ends of the drum have a truncated cone portion which narrows the openings to a smaller diameter than the diameter of the drum and the outlet end is provided with a scroll adapted to lift the dross from the level of the bottom of the drum to a level of the bottom of the outlet when the drum is rotated in one direction.

Further treatment is provided by a cylindrical screen having a pattern of perforations extending axially in alignment with the outlet of the drum so that small particles are separated from larger particles as they emerge from the outlet.

A preferable embodiment contemplates the use of a vibratory conveyor trough adapted to receive dross and feed it to the inlet opening of the drum. This vibratory conveyor trough may also be cooled by means of a surrounding bath provided by a pan of water.

The efficiency of the apparatus is enhanced by means which include an elevator cage adapted to receive a dross pot and including means for stirring the contents of the dross pot to effect separation of metal from slag, and further comprising carriage means adapted to engage and lift the dross pot from the cage, transport it to the vibratory feeder and tilt the contents thereof into the feeder trough for delivery to the drum.

The invention may be better understood by the following description of one embodiment thereof with reference to the drawings in which.

Figure 1:
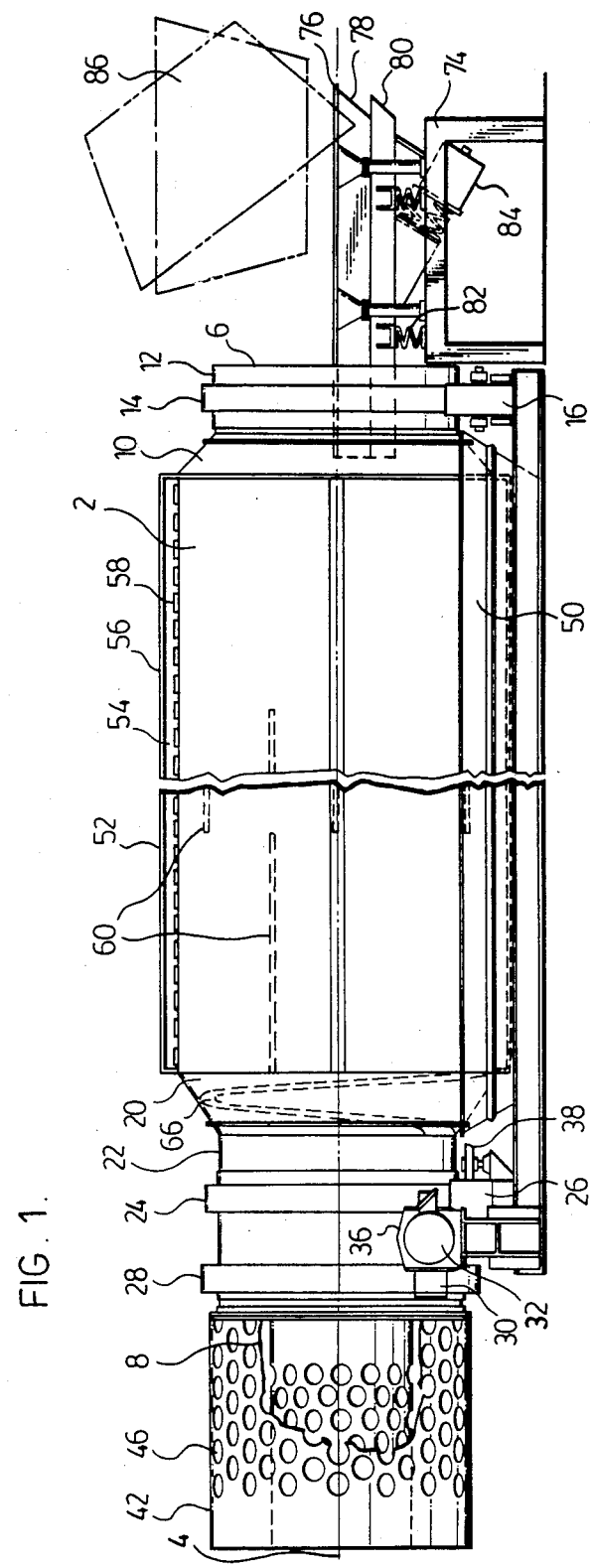
FIG. 1 is a longitudinal elevation view of a dross cooler in accordance with the present invention.
Figure 2:
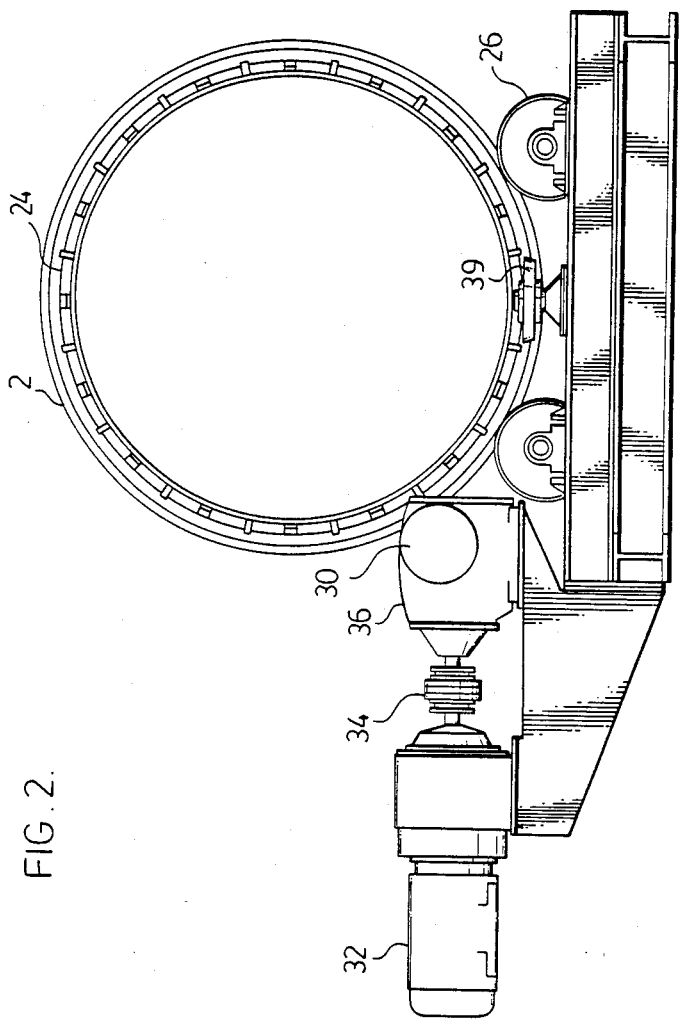
FIG. 2 is a cross-sectional view of the dross cooler in FIG. 1.

For purposes of description, the illustrated embodiment is discussed in relation to its use in treating dross from an aluminum smelting operation (although the invention may be adapted for use in other processes or the treatment of other metals).

The illustrated embodiment comprises a cylindrical drum 2 having a substantially horizontal axis 4 (although it may be slightly inclined, depending on design parameters) with an inlet end 6 and an outlet end 8.

Although size is not an essential feature of the invention, a typical device as illustrated might be in the order of 10 feet in diameter and 20 feet long.

The inlet end of the drum has a conical portion 10 and a cylindrical inlet sleeve 12 surrounded by a steel tire 14 mounted to rotate on supporting rollers 16.

At the outlet end the cylindrical drum has a similar conical portion 20 and outlet sleeve 22 having a steel tire 24 mounted to rotate on supporting rollers 26, similar to 16.

Also mounted on the sleeve 22 is a spur gear 28 which is rotatably driven by a pinion 30 powered by a motor 32, a coupling 34 and a speed reducer 36.

Thrust rollers such as 38 are employed to prevent longitudinal movement of the drum and maintain alignment between the steel tires and the support rollers and between spur gear and pinion.

On the outboard end of the sleeve 22 there is mounted a cylindrical screen 42 extending from and axially aligned with the drum. The screen has a pattern of relatively large holes 46 to separate coarse and fine particles.

Figure 3:
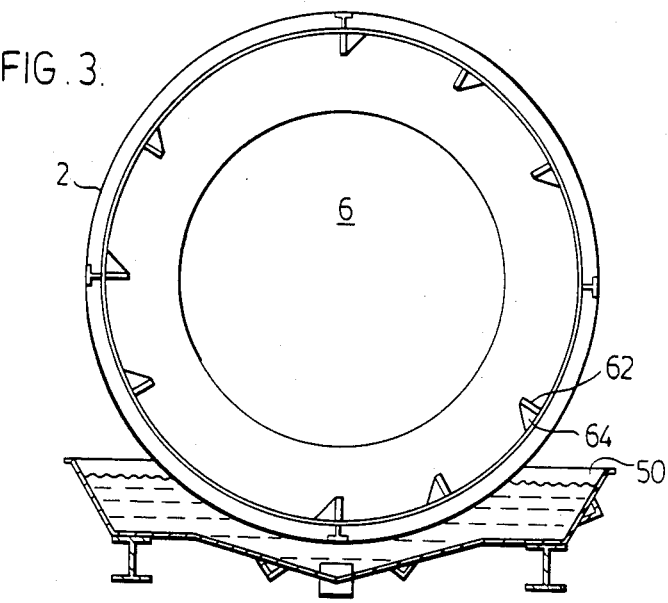
FIG. 3 is a cross-sectional view of the drum and cooling trough of the dross cooler in FIGS. 1 and 2.

As can be seen in FIG. 1 and FIG. 3, the drum rests in, but not on, a shallow pan 50 designed to hold a bath of cooling water so that the lowermost portion of the sheel of the drum is continuously cooled as it passes through the water bath.

To aid in this bathing and cooling process, a set of paddles 52 are mounted on the outside of the cylindrical drum, in the illustrated preferred embodiment, at four spaced locations around the periphery and running the length of the drum parallel to the axis. These paddles comprise a radially entending plate 54 and a perpendicular flange 56. The plate 54 has a series of slots 58 adjacent to the periphery of the drum.

The inside surface of the drum 2 is provided with a series of flights 60, as seen in FIG. 1 and FIG. 3, at spaced intervals around the circumference and at spaced intervals along the length of the inner surface of the drum. These flights are formed by a radially extending plate 62 and a supporting bracket 64.

Figure 4:
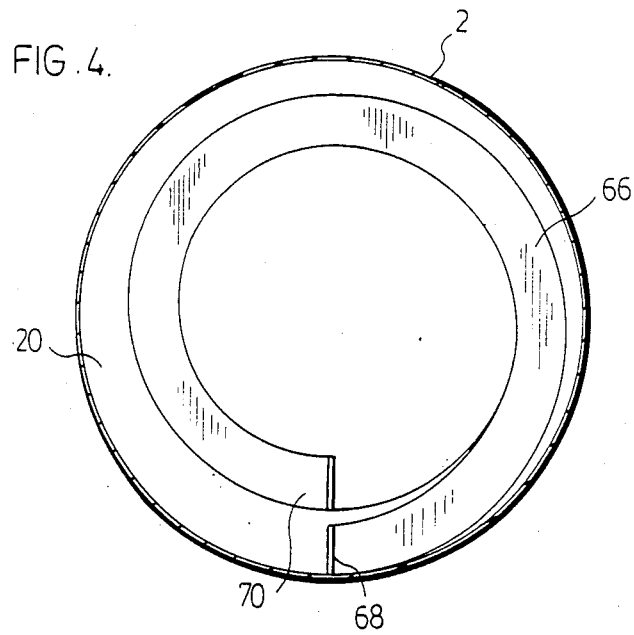
FIG. 4 is a cross-sectional view of a portion of the drum of the dross cooler.

The outlet cone 20 of the drum is provided with a helically and spirally shaped auger 66 which can be seen in FIG. 1 and FIG. 4. The auger or scroll extends from a point 68 adjacent to the cylindrical portion of the drum and extends in a configuration substantially perpendicular to the axis of the drum around the inner surface of cone 20 to its outboard end 70 adjacent to the sleeve 22. Its function will be explained later.

At the entrance end of the drum is illustrated a vibrating feeder designed to supply input material to the drum. The feeder assembly comprises a support structure 74 supporting a trough 76 which has an opened end projecting into the interior of the drum, the outboard end being closed by a panel 78. The trough is emersed in a bath of cooling water contained by a pan 80 and the mechanism is supported on resilient springs such as 82 and has a vibratory mechanism 84 to cause it to vibrate.

Illustrated in association with the feed mechanism is a dross pot 86 which is a conventional device not part of this invention and which may be moved by a forklift vehicle for conveyiny dross to the cooler.

Figure 5:
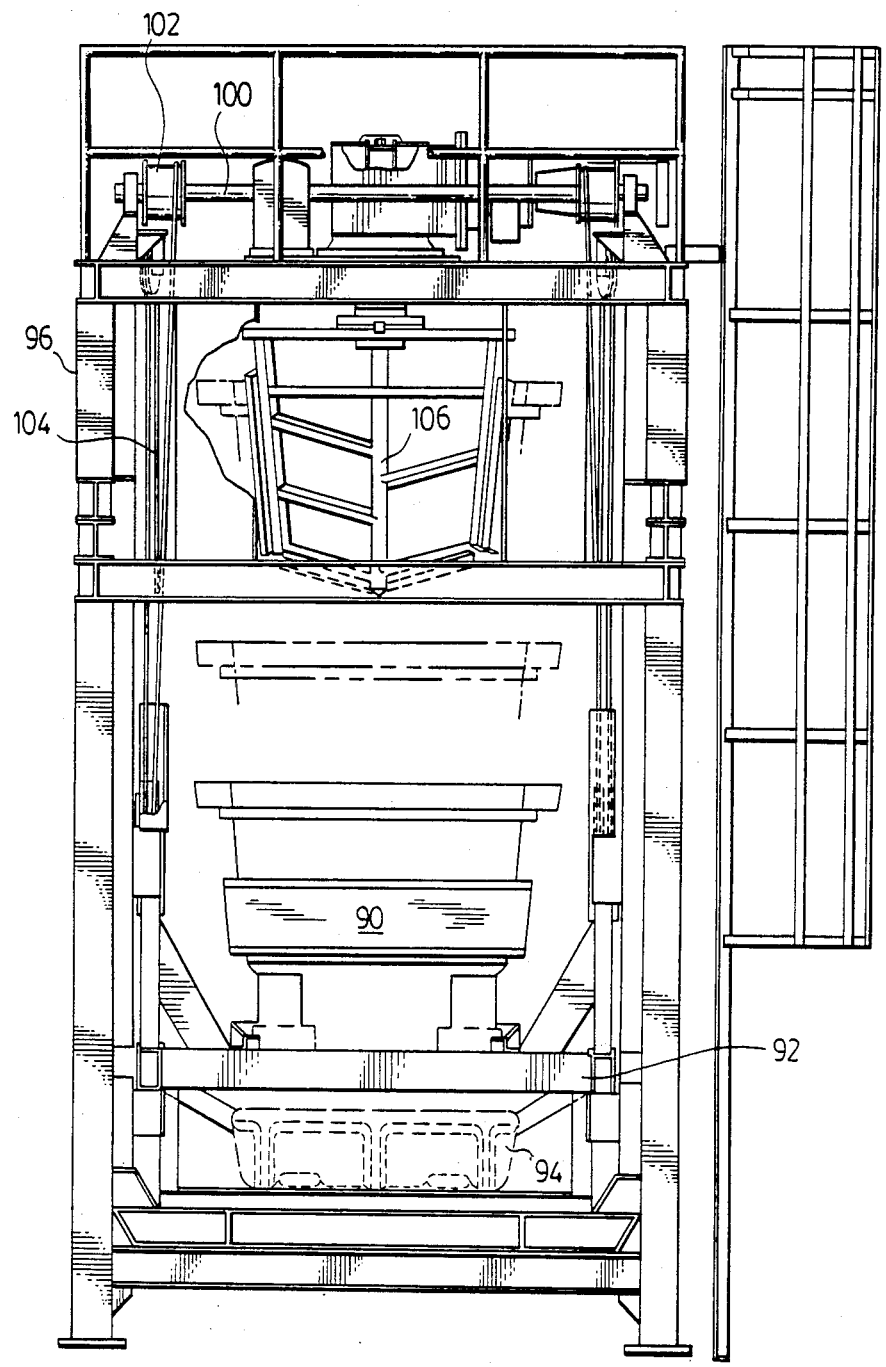
FIG. 5 is an elevation view of a portion of a loading assembly associated with the cooler in FIG. 1.
Figure 6:
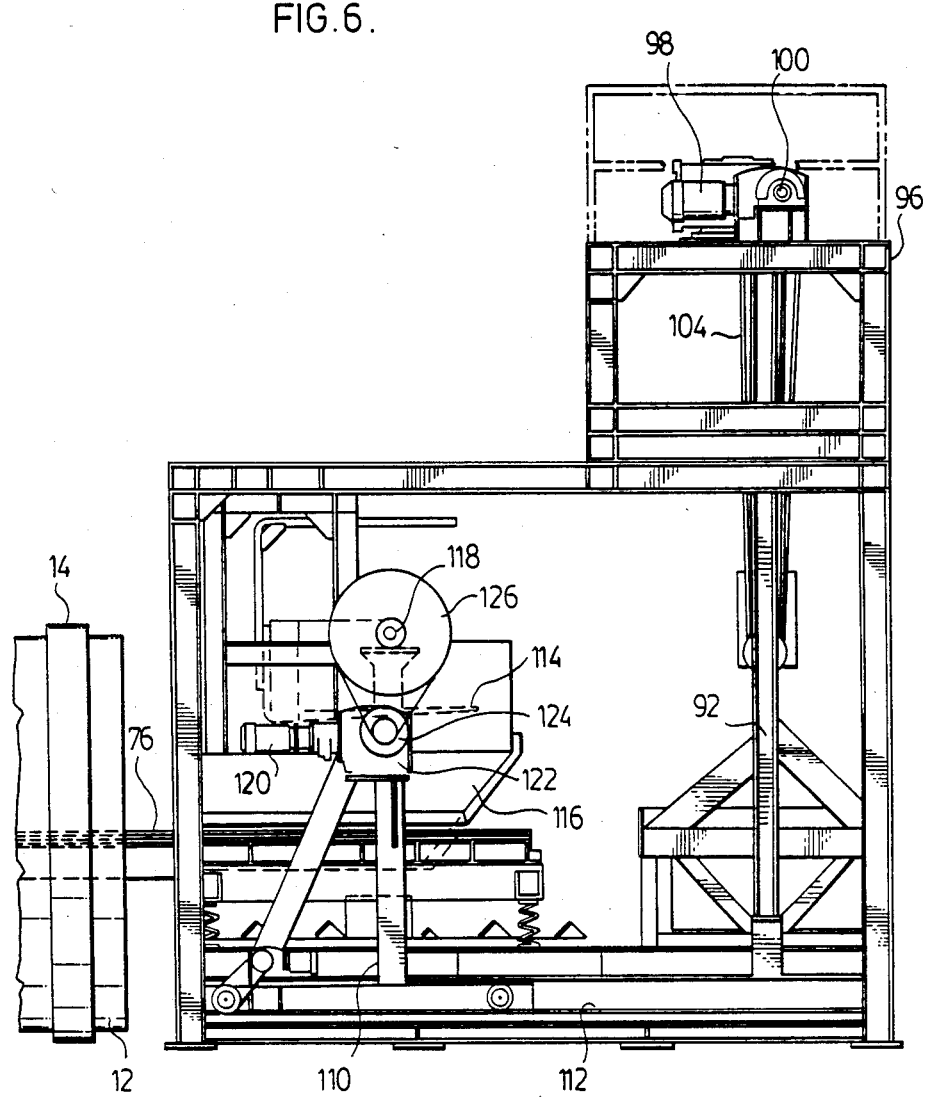
FIG. 6 is a side elevation view of the loading assembly in FIG. 5.

Illustrated in FIGS. 5 and 6 is a more elaborate and efficient system for delivering dross than the conventional dross pot illustrated in FIG. 1.

In this embodiment a dross pot 90 is shown having been delivered to an elevator cage 92 beneath which is an ingot mold 94. The head frame structure 96 supports an electric motor 98 which drives an axle 100 to turn pulleys 102, operating cables 104, by which the cage, dross pot, and ingot mold may be raised into the head frame assembly so that an agitator 106 comprising a series of paddles will be positioned within the dross pot. The agitator 106 can then be rotated to stir the dross and its included metal content within the dross pot.

The dross pot is provided with a conventional valve outlet on the bottom (not illustrated) so that metal which accumulates and drops to the bottom can be released into the ingot mold to form ingots of more or less uncontaminated metal.

As best seen in FIG. 6 the assembly is provided with additional mechanism so that when the dross pot is subsequently lowered, afterstirring, to the position illustrated in FIG. 5, a transfer car assembly 110 can be moved on a track 112, to the right, where a pair of fork legs 114 can engage and lift the dross pot from the elevator cage. The transfer car is then moved to the left until the dross pot is suspended above the vibratory feeder 76. In this embodiment, to facilitate the travel back and forth of the transfer car, the vibratory feeder trough is not closed at the outboard end but a hopper 116 is provided with the transfer car instead to keep the feed material from travelling off the wrong end of the vibratory feeder.

The structure supporting the fork legs is mounted on an axle 118 supported by the transfer car. By means of the electric motor 120, gear reducer 122, drive pulley 124, and the large diameter pulley 126, the fork legs and the dross pot supported thereby can be caused to rotate about the axle 118 so as to tip the contents of the dross pot into the hopper and the feeder trough in a manner similar to that illustrated in FIG. 1.

At this point the description of this preferred embodiment may be further illustrated by discussing the operation of the invention as it relates to the treatment of dross from an aluminum smelting operation.

As previously mentioned, the smelting of base metals such as aluminum typically produces a scum, slag or dross which in the case of aluminum smelting consists of impurities generally referred to as gangue, salts, fluxes, etc. which comprise approximately 10 to 20%, aluminum oxide ($AL_2O_3$) which may make up between 30 to 60% and metallic aluminum which may make up between 30 to 60%. This residue or dross is left over from the smelting process after the liquid aluminum has been drawn off and poured into ingots. It is disposed of in a dross pot similar to those illustrated in FIG. 1 and FIG. 5.

The illustrated invention is designed to deal with the dross by cooling it, breaking it up, and removing the inclusions of metallic aluminum. To this end the dross pot containing the dross is delivered to and deposited in the cage 92, as illustrated in FIG. 5. The cage (with the dross pot and mold) is then raised by means of the elevator system previously referred to until the pot surrounds the agitator is caused to rotate so as to stir the dross thereby enabling the liquid metallic aluminum which is not yet solidified to accumulate in larger drops and separate from the rest of the dross.

During all this procedure the valve at the bottom of the dross pot is left open so that liquid metallic aluminum which settles to the bottom can be drawn off to the ingot mold. After the dross has been stirred and agitated for approximately 2 or 3 minutes, the cage, dross pot, and mold are lowered to the illustrated position until the separated matallic alumimun has been collected in the mold. The remainder of the dross is then to be treated by the dross cooler as follows.

The transfer car 110 is moved into position so that the fork legs 114 engage the dross pot and lift it from the cage off the elevator assembly. The transfer car is then moved back into the position illustrated in FIG. 6 where the dross pot is located over the shaker feed trough 76 and by means of the mechanism previously described, the fork leg structure and the dross pot are caused to tilt in a counterclockwise direction, as illustrated in FIG. 1, so that the dross in the pot is caused to tumble into the hopper 116 and on to the shaker trough 76. By means of the oscillating mechanism 84 and the resilient suspension 82, the trough 76 is caused to vibrate so that the material dumped therein moves along towards the open end of the sleeve 12 and falls from the end of the trough into the drum.

The drum meanwhile is caused to rotate (in a counterclockwise direction as seen in FIG. 3) and the material dumped into the drum is picked up by the flights 62 so that it is carried partly up the interior circumference of the drum and then caused to tumble back down to the bottom.

It will be remembered that the dross when delivered to the cooler is quite hot (in the order of 1500° C. or more) and therefore the feeder trough 76 is normally water cooled and the drum is partially emersed in a water bath to cool them.

The dross material dropped in the inlet end will, because of the tumbling mechanism, gradually migrate along the length of the drum towards the outlet end. As it does so the flights continually stir the material and spread it about in the drum so that as it tumbles it is caused to cool and to break up into smaller pieces. Because much of the material is constantly being picked up and spread, new material is constantly allowed to contact the wall of the drum so that it is cooled and in a semi-solidified state becomes more friable and is easily broken.

In order to assist in the cooling operation, the drum is provided with paddles 52 which, as the drum rotates, tend to pick up water causing it to drain through the slots 58 and run down the sides of the drum aiding in the cooling. The drum may be (and ideally is) further cooled by spraying water on it from above.

To aid in the movement of the material from one end to the other the drum may be slightly inclined (i.e. in the order of 1° approximately) although it will also work if it is horizontal. The choice depends on design parameters such as the length of the drum and the speed at which the material is designed to pass therethrough.

While the waste material is caused to crumble and break as it is cooled, the metallic aluminum tends to form soft malleable metallic particles.

As the slag and aluminum oxide and metallic particles become cooled and broken, they migrate to the outlet end of the drum where they are engaged by a lower inboard end 68 of the auger or scroll 66 (which turns in a clockwise direction in the view illustrated in FIG. 4). As the auger turns the material is caused to rise up the incline of the cone 20 until it reaches the end 70 of the scroll and is deposited on the sleeve 22. The material by this time is substantially cooled and broken up so that it travels as a crushed or powdered material along the sleeve 22 until it reaches the screen 42. As it passes along the screen 42 the finer material will be caused to drop through the perforations 46 while the coarser material will proceed to the end of the screen and thus be separated from the fines. It should be realized that further segregation may be provided by two concentric screens, one of which has a larger diameter than that illustrated but with smaller perforations.

At this point the dross will have been cooled and broken up to a point where the aluminum oxide and gangue can be separated from the metallic aluminum by conventional processes and the waste disposed of while the metallic aluminum is returned as valuable product to the smelter.

Thus, by this apparatus the cooling or processing of dross is made more efficient, automatic and continuous. It is also handled more quickly and efficiently so that a minimum amount of oxidation of the aluminum takes place.

Figure 7:
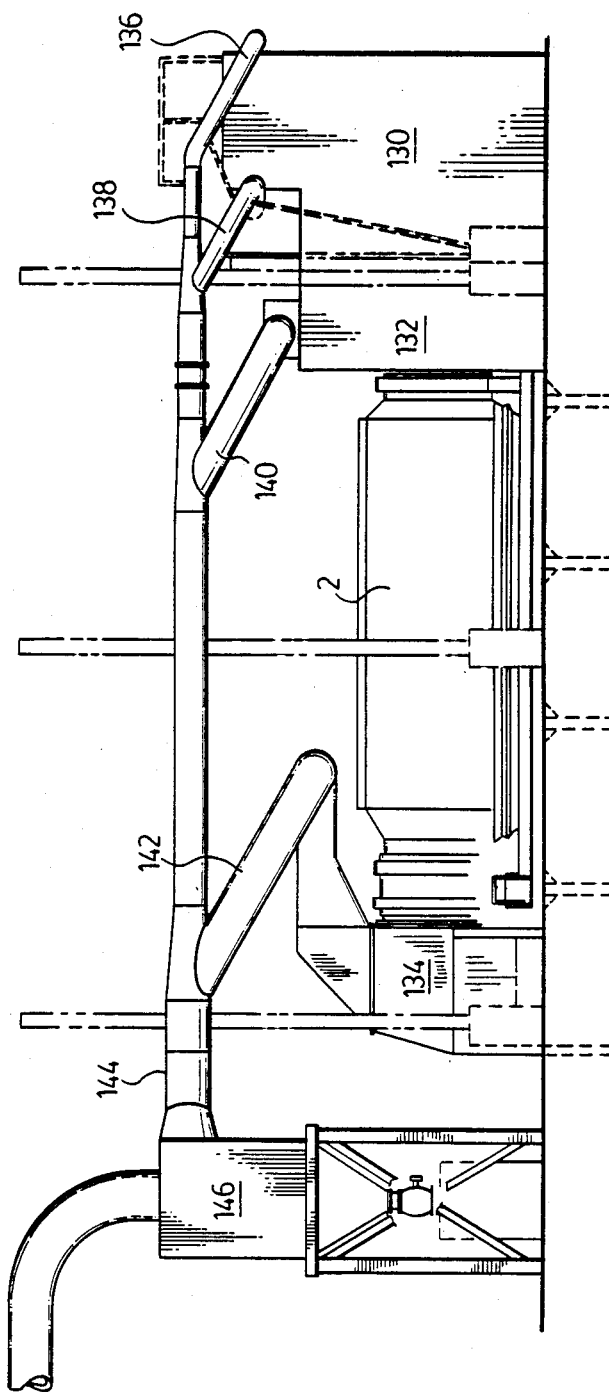
FIG. 7 is an elevation view of the dust collection and ventilation system for the dross cooler.

The operation of the apparatus described above can be made more effective and environmentally acceptable by a dust collection and ventilation system as illustrated in FIG. 7.

In FIG. 7 the dross cooler drum 2 is clearly visible but the dross delivery system and the vibratory feeder are each enclosed in enclosures 130 and 132 respectively, and the outlet end of the drum and the screen is enclosed by enclosure 134. Each of these enclosures are connected by means of ducts 136, 138, 140, 142 and 144 to a cyclone dust collector 146.

It will be realized that by its nature the process of cooling hot dross and metal aluminum and aluminum oxide and the process of breaking and grinding the material results in hot gases and fine dust or powders being emitted. The enclosures and duct system illustrated in FIG. 7 allows this contaminated air to be withdrawn and passed through a cyclone system to remove dust before venting to the atmosphere.

If necessary or desirable, this ventilation and dust control system can also be used to provide a certain amount of air flow in the system so as to enhance the cooling effect of the apparatus. Furthermore, to a certain extent controlling the atmosphere may also be adapted to reduce the amount of oxidation which takes place during the dross cooling process.

Although the illustrated preferred embodiment contemplates a drum in which dross is fed into one end and removed from the other, it is possible to use such a device where the dross is introduced at one end, treated and removed through the same end. However, this is thought to be in most cases less desirable or efficient because it would require treating dross in a batch process rather than continuously. In such a configuration the scroll 66 would be employed at the inlet/outlet end and the drum would have to be rotated in one direction to keep the material contained therein and rotate it in the opposite direction to lift the material out of the drum.

Even in the embodiment illustrated in FIG. 1 it should be realized that the drum can be rotated in one direction while the dross is being contained therein for cooling and breaking and then the direction of the drum may be reversed in order to use the auger to remove the treated dross to the outlet end.

The ventilation system in FIG. 7 may be employed not only to clean the atmosphere in and around the apparatus but by use of inert gases may be used to regulate any oxidation or other chemical reactions taking place in the dross. The flow of air or gases may be regulated to effect cooling and can be controlled by a series of dampers incorporated in each of the illustrated ducts.

It will of course be realized that many modifications and variations to the illustrated embodiment may be adopted without departing from the inventive concept herein.

What we claim as new and desire to protect by Letters Patent of the United States is as follows:

1. Dross treatment apparatus comprising:
   a drum having a cylindrical shell mounted to rotate about a substantially horizontal axis,
   means to rotate said drum about said axis,
   an inlet opening at one end of said drum,
   said axis being inclined downwardly towards said outlet end at between 0 and 2 degrees from the horizontal,
   means to feed dross to the inside of said drum through said inlet opening,
   a series of flights at spaced intervals located on the inside surface of said drum shell adapted to tumble the dross therein upon rotation of said drum, means to remove said tumbled dross from said drum through said outlet opening, said inlet and outlet openings including a truncated cone extending from the respective end of said shell of said drum radially inwardly and longitudinally beyond the said end of said shell to form an opening of smaller diameter than said drum.

2. Apparatus as claimed in claim 1 further comprising a helical-spiral scroll adapted to lift the dross from the level of the bottom of the cylindrical shell to the level of the outlet opening upon rotation of said drum in one direction, said helical-spiral scroll comprising a wall mounted on the inside surface of said outlet truncated cone, substantially normal thereto, and extending from the outermost diameter of said cone adjacent the end of said drum in a circumferential and longitudinal direction to a point at the innermost diameter of said truncated cone adjacent the outlet thereof.

3. Apparatus as claimed in claim 2 further comprising a cylindrical screen extending outwardly from the outlet opening of said outlet cone axially aligned with said axis of said drum, said cylindrical screen having a pattern of perforations therethrough adapted to permit particles of dross of smaller size to pass therethrough, and having an open end remote from said outlet cone to allow the discharge of larger particles of dross.

4. Apparatus as claimed in claim 1 in which said inlet opening is at one end of said drum and said outlet opening is at the opposite end of said drum.

5. Apparatus as claimed in claim 1 in which said means to feed dross to said drum includes a vibratory conveyor trough adapted to receive dross, said vibratory conveyor trough adapted to deliver material to the inlet opening of said inlet cone.

6. Apparatus as claimed in claim 5 further comprising an elevator cage adapted to receive a dross pot therein, said elevator cage comprising a platform and comprising hoisting means to elevate said cage and said dross pot therein, stirring means adapted to stir the contents of said dross pot when said elevator cage is raised to engage said stirring means, carriage means adapted to engage and lift said dross pot from said elevator cage and transport said dross pot to a position above said vibratory conveyor trough, and means to tilt said dross pot to deposit the contents thereof on to said vibratory conveyor trough.

7. Apparatus as claimed in claim 1 including cooling means, said cooling means comprising a water bath underlying said drum and adapted to immerse at least a portion of the said drum shell therein, paddle means extending longitudinally along the outer surface of said shell and projecting radially outward from said shell and having a series of slotted openings along said paddle means adjacent to said shell to allow water to pass therethrough.

* * * * *